May 9, 1939.  R. F. KNEISLEY  2,157,417

AUTOMATIC CIRCUIT SELECTOR

Filed Aug. 2, 1937

Inventor
Richard F. Kneisley
Owen & Owen
By
Attorneys

Patented May 9, 1939

2,157,417

UNITED STATES PATENT OFFICE 2,157,417

AUTOMATIC CIRCUIT SELECTOR

Richard F. Kneisley, Toledo, Ohio, assignor to The American Floor Surfacing Machine Company, Toledo, Ohio, a corporation of Ohio Application August 2, 1937, Serial No. 156,877

2 Claims. (Cl. 172—179)

This invention relates to automatic circuit selectors for multi-voltage motors, and is more particularly directed to an automatic circuit changing means by which the windings of the motor are properly connected with relation to the supply voltage.

The invention is particularly useful in connection with motors which are adapted to run on 110 or 220 volts, and which are provided with two windings to be connected in parallel for 110 volt operation and in series for 220 volt operation. It is customary to provide a panel to which the ends of the windings are brought out and for the operator to make the proper connections in accordance with a circuit diagram furnished him before connecting the motor to the supply line. However, there is the possibility that the operator might improperly make such connections and thereby subject the motor to excessive voltage.

The primary object of the present invention is the provision of means to change automatically the connections of the windings of a multi-voltage motor before the line connection is made to the windings.

Another object of the invention is the provision of a simple and efficient, automatic means to connect the windings of a multi-voltage motor in accordance with the voltage of the power supply to which the motor is to be connected.

Other objects of the invention will be apparent from the following detailed description, and from the accompanying drawing, in which—

Figure 1:
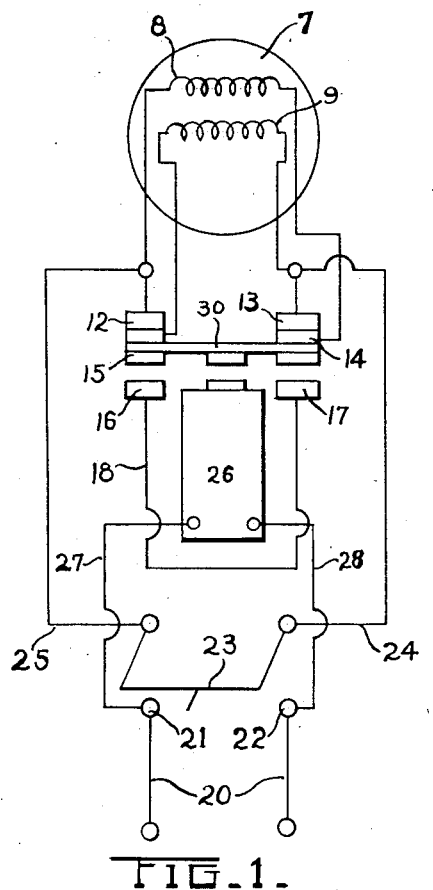
Figure 2:
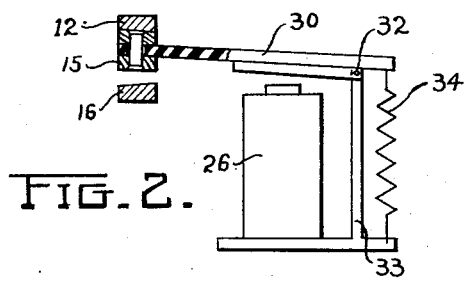
Figure 3:
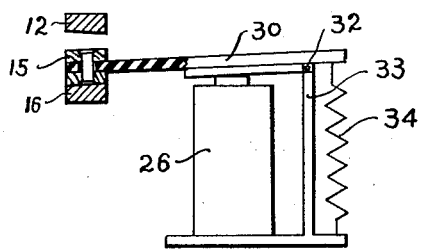
Figure 4:
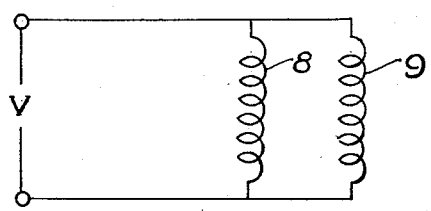
Figure 5:
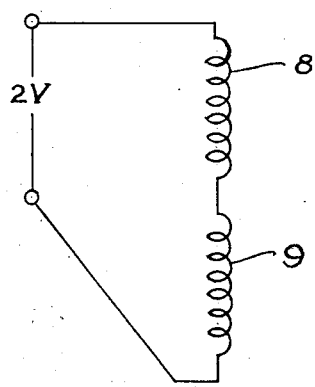

Figure 1 is a diagram of a motor and supply circuit and control means therefor embodying the present invention; Figs. 2 and 3 are somewhat diagrammatic views, with parts broken away, of a relay and associated contacts which may be used to accomplish the change in connections, the contacts being shown in their two operative positions, and Figs. 4 and 5 are diagrammatic representations of the motor windings in their two operating connections.

Referring to the drawing, the motor is designated 7 in Fig. 1 and is provided with two windings 8 and 9. The motor structure is the usual one which will permit operation on a double voltage supply, for instance on either 110 or 220 volts. As shown in Figs. 4 and 5, when the motor is connected to the smaller voltage V, the windings should be connected in parallel, while, if the motor is to be operated from the larger voltage supply 2V, the windings should be connected in series. Ordinarily, this circuit change from parallel to series is manually accomplished.

The ends of the motor winding 8 are brought out to connect with a stationary contact 12 and a movable contact 14, while the ends of the motor winding 9 are brought out to connect with a stationary contact 13 and a movable contact 15. Stationary contacts 16 and 17 are provided in opposition to the stationary contacts 12 and 13 and in the path of movement of the movable contacts 14 and 15. The stationary contacts 16 and 17 are electrically connected by a lead 18.

The motor is adapted to be supplied with current from a suitable source of electrical energy, such as line 20, which is connected to one side of a double pole motor switch through contacts 21 and 22. The switch is designated 23 and is connected through leads 24 and 25 to one side of each of the motor windings 8 and 9. The switch 23 may be of any suitable type and, if desired, may be constructed to stand normally in open position.

The present invention provides a means to connect the motor windings 8 and 9 in their proper relationship, depending on the supply voltage, before the motor switch 23 is closed, so that at the time of closing this switch to operate the motor, the windings will be in their proper connection. To accomplish this, a relay including a solenoid 26 is connected through leads 27 and 28 to the contacts 21 and 22 of the double pole switch, and through these contacts directly to the supply line. It will be seen that as soon as connection is made to the supply line, current will flow through the solenoid 26. The relay structure may take any suitable form, and, as shown in Figs. 2 and 3 may include a T-shaped clapper element 30 on the ends of the crossmember of which the movable contacts 14 and 15 are carried. The clapper is hinged as at 32 to a frame member 33, and at its far end is connected to a tension spring 34, so that it is biased to stand in the position shown in Fig. 2 with the movable contacts 14 and 15 in electrical connection with the stationary contacts 12 and 13. The winding of the solenoid 26 is such that if the supply to the solenoid is of the lower value, for instance 110 volts, the flux from the solenoid is insufficient to pull the clapper element 30 down against the tension of spring 34, so that the parts remain in the position to which they are biased by the spring. However, if the supply to the solenoid is of the higher value, for instance 220 volts, the flux developed by the solenoid is sufficient to pull the clapper and movable contacts down to the position shown in Fig. 3, so that the movable contacts now abut and electrically connect with the stationary contacts 16 and 17.

The change in position of the movable contacts 14 and 15 above-noted effects a change from parallel to series connection of the motor windings. For the parallel connection, the circuit may be traced from contacts 21 and 22 through the motor switch 23, thence through lead 24 directly to one end of winding 9 and through stationary contact 13 and movable contact 14 to one end of winding 8. The other pole of the switch 23 at the same time is connected through lead 25 directly with the other end of winding 8 and through stationary contact 12 and movable contact 15 with the other end of winding 9.

The series connection may be traced as follows: When the movable contacts 14 and 15 abut against stationary contacts 16 and 17, the circuit is from line contact 22 through one arm of the switch 23, lead 24 directly to one end of winding 9, through winding 9 to movable contact 15, through stationary contact 16 and lead 18 to stationary contact 17, through movable contact 14 to one end of winding 9, through winding 9 to the direct connection with lead 25, through lead 25 back to the other arm of switch 23, and hence to line contact 21.

It will be seen that the present invention provides a simple and efficient means to control the winding connections of a double voltage motor before the motor switch is closed, so that the windings will always be in the proper relationship for the supply voltage.

It will further be seen that the operator cannot possibly make a mistake in the winding connections, since these connections are entirely beyond his control. The parts used are simple and are not apt to get out of order or to deteriorate in use, since at the time connection was made between the movable contacts and stationary contacts to which the windings are connected, no current is flowing in the windings, so that there will be no pitting of the contacts by reason of breaking a circuit through which current is flowing. Obviously, any suitable means may be substituted for the relay so long as it is actuated from the supply line ahead of the motor switch. This substitution may be made without departing from the invention as defined in the appended claims.

Having thus described my invention, what I claim as new and desire to secure by United States Letters Patent, is:

1. The combination with an electric motor having two windings and adapted for operation on two line voltages, depending on whether the windings are connected in series or parallel, and a supply line for said motor, of an electromagnetically operated two position switch, a motor switch adapted to connect the motor to the line, means for connecting the motor windings to the two position switch for series or parallel operation, depending on the position of said two position switch, means for connecting the windings of the motor to the motor switch through said two position switch, and means for connecting the electromagnet of said two position switch to the line ahead of said motor switch whereby the electromagnetically operated switch connects said windings in parallel for the lower voltage and in series for the higher voltage.

2. The combination set forth in claim 1 and means to bias said two position switch to the position for connecting said motor windings in parallel.

RICHARD F. KNEISLEY.